United States Patent
Brady et al.

(10) Patent No.: US 9,580,189 B2
(45) Date of Patent: Feb. 28, 2017

(54) ACTUATION SYSTEM FOR FLIGHT CONTROL SURFACE

(71) Applicant: Airbus Operations GmbH, Hamburg (DE)

(72) Inventors: Michael Brady, Bremen (DE); Christoph Winkelmann, Buchholz (DE)

(73) Assignee: Airbus Operations GmbH (DE)

(*) Notice: Subject to any disclaimer, the term of this patent is extended or adjusted under 35 U.S.C. 154(b) by 268 days.

(21) Appl. No.: 14/277,349

(22) Filed: May 14, 2014

(65) Prior Publication Data
US 2014/0343784 A1    Nov. 20, 2014

(30) Foreign Application Priority Data

May 17, 2013   (EP) .................................... 13168196

(51) Int. Cl.
*B64C 13/26*   (2006.01)
*B64C 9/00*   (2006.01)
*B64F 5/00*   (2006.01)
*B64C 9/16*   (2006.01)
*B64D 45/00*   (2006.01)
*B64C 13/28*   (2006.01)

(52) U.S. Cl.
CPC ............. *B64F 5/0045* (2013.01); *B64C 9/16* (2013.01); *B64C 13/28* (2013.01); *B64D 45/0005* (2013.01); *B64D 2045/001* (2013.01)

(58) Field of Classification Search
CPC .............. B64F 5/00; B64C 13/26; B64C 9/00
See application file for complete search history.

(56) References Cited

U.S. PATENT DOCUMENTS 6,299,108 B1 * 10/2001 Lindstrom ................ B64C 9/02
                                                                244/194
6,685,138 B1    2/2004  Krantz
(Continued)

FOREIGN PATENT DOCUMENTS

CN    100375703 C     3/2008
CN    101301929 A    11/2008
(Continued)

OTHER PUBLICATIONS

European Search Report (EP 13 16 8196) (Nov. 4, 2013).
Chinese Office Action dated Oct. 10, 2015.

*Primary Examiner* — Mussa S Shaawat
(74) *Attorney, Agent, or Firm* — Lerner, David, Littenberg, Krumholz & Mentlik, LLP

(57) ABSTRACT

The present disclosure provides an actuation system for a flight control surface of an aircraft, having: a support frame for supporting a flight control surface, the support frame being configured to be mounted to an airframe structure of the aircraft for movement between a first position and a second position to operate and move the control surface; an actuation mechanism configured to effect movement of the support frame between the second position and the first position; and a detection device for detecting a fault in the actuation mechanism, the detection device comprising a deflector configured to deflect or skew the support frame away from or out of the first position in the event of a fault in the actuation mechanism.

15 Claims, 3 Drawing Sheets

(56) References Cited

U.S. PATENT DOCUMENTS

| | | | |
|---|---|---|---|
| 7,048,234 B2* | 5/2006 | Recksiek | B64C 13/503 244/213 |
| 8,033,509 B2 | 10/2011 | Yount et al. | |
| 8,398,019 B2 | 3/2013 | Schlipf | |
| 8,814,085 B2* | 8/2014 | Richter | B64C 13/42 244/211 |
| 9,108,724 B2* | 8/2015 | Rechsiek | |
| 2004/0099763 A1 | 5/2004 | Boehringer | |
| 2008/0265090 A1 | 10/2008 | Schievelbusch | |
| 2010/0100355 A1* | 4/2010 | Marx | B64D 45/0005 702/183 |
| 2011/0255968 A1* | 10/2011 | Recksiek | B64D 45/0005 416/23 |
| 2012/0091282 A1* | 4/2012 | Spiller | B64C 9/16 244/213 |
| 2013/0181089 A1* | 7/2013 | Recksiek | B64C 9/16 244/99.3 |

FOREIGN PATENT DOCUMENTS

| | | |
|---|---|---|
| CN | 101484355 A | 7/2009 |
| DE | 10 2010 025475 A1 | 12/2011 |
| EP | 0867362 A2 | 9/1998 |
| EP | 1982916 A2 | 10/2008 |
| WO | 2008/001336 A1 | 1/2008 |

* cited by examiner

ACTUATION SYSTEM FOR FLIGHT CONTROL SURFACE

CROSS-REFERENCES TO RELATED APPLICATIONS

This application claims benefit of and priority to the European patent application No. 13 168 196.7, filed May 17, 2013, the entire disclosures of which is incorporated herein by way of reference.

TECHNICAL FIELD

The present invention relates to an actuation system for a flight control surface of an aircraft, and in particular for a flight control surface provided by a wing flap or slat. The invention also relates to an aircraft comprising an airframe structure, and especially a wing structure, that incorporates such an actuation system. In particular, the actuation system of the invention is designed to assist in the detection of a problem or fault in the operation of a flight control surface. Accordingly, the invention also relates to a method of detecting a problem or fault in the actuation of a flight control surface of an aircraft.

TECHNICAL BACKGROUND

Reliable operation of flight control surfaces, such as wing flaps or slats, in civil and military aviation, is naturally important for ensuring safe and dependable air travel. It is therefore desirable to be able to detect any impairment of function in such movable flight control surfaces before the aircraft is in flight. For safety reasons, these types of flight control surfaces (e.g. high-lift flaps) are typically required to have multiple load path supports, thus providing redundancy. Furthermore, a problem or fault in any one of the load paths should be detectable generally within one flight.

Because of the redundancy provided in the load path supports, each control surface will usually have more than one actuator or drive unit, with each drive unit being powerful enough or having sufficient strength to operate and/or to structurally support the control surface alone. Where one of these load paths is compromised due to a problem or fault, however, it is highly desirable to be able to detect this promptly.

SUMMARY OF THE DISCLOSURE

It is therefore an idea of the present invention to provide a new and improved aircraft control surface actuation system designed to enable detection of an operational problem or fault, and to provide an aircraft that incorporates such a system. It is a further object of the invention to provide a corresponding method of detecting a problem or fault in the actuation of an aircraft control surface.

According to one aspect, therefore, the invention provides an actuation system for a flight control surface of an aircraft, comprising:

a support frame for supporting a flight control surface of an aircraft, the support frame configured to be mounted on an airframe structure of the aircraft for movement between a first position and a second position to move and operate the flight control surface;

an actuation mechanism configured to effect movement of the support frame between the second position and the first position; and a detection device for detecting a problem or fault in the actuation mechanism, wherein the detection device comprises at least one deflector configured to deflect or skew the support frame out of or away from the first position in the event of a problem or fault in the actuation mechanism.

In this way, the system is configured to generate a detectable deflection or skewing of the support frame supporting the flight control surface if a particular problem or fault occurs in the actuation mechanism. By then identifying or detecting that deflection or skewing of the support frame, it is possible to ascertain that the problem or fault in the actuation mechanism has occurred. The detection device of the system is thus designed to sense or measure any deflection or skewing of the support frame with respect to the first position. Although air-loads acting upon a flight control surface (e.g. provided by a high-lift wing flap or slat) of an aircraft in flight may in some circumstance create a skewing of that flap or slat where there is a fault in an actuation mechanism, air-loading alone cannot be relied upon to create a detectable skewing within one flight. Furthermore, it is desired to be able to detect such a problem or fault in the operation of or the structural support provided by the actuation mechanism before take-off, i.e. when the aircraft is still on the ground. The system ensures that a problem or fault in the operation of the actuation device or in the structural support it provides becomes apparent by virtue of the at least one deflector configured to deflect or skew the support frame, and a control surface supported thereon, with respect to the first position.

In one embodiment, the detection device comprises one or more sensors for detecting a deflection or skewing of the support frame with respect to the first position. The one or more sensors may be configured to measure and/or compare a deflected or skewed position (angular or otherwise) of the support frame supporting the control surface. In this regard, the sensor(s) may measure or detect a position of the support frame relative to the rest of the airframe structure. Alternatively, in the case of the system comprising at least two actuation mechanisms, the sensor(s) may measure or detect or compare a position of one actuation mechanism with respect to a position of the other actuation mechanism. To this end, the one or more sensors will require a sensing or measurement accuracy that depends on a predetermined or guaranteed level of deflection or skewing that will result from the at least one deflector in the event of a problem or fault in the actuation mechanism. This advantageously enables the detection mechanism to be integrated in already existing skew detection systems on board of aircraft.

In another embodiment, the deflector includes at least one biasing member for generating a biasing force that acts against the moving force of the actuation mechanism to deflect or skew the support frame out of or away from the first position. The biasing member(s) may be resilient and comprise at least one spring member. In this regard, the actuation mechanism may be configured and arranged to operate against the biasing force to move the support frame to the first position. That is, the biasing force generated by the biasing member preferably acts in a direction opposite or counter to the actuation mechanism as it operates to move the support frame towards the first position. The biasing member may be mounted on the airframe structure, or on the support frame, or on the actuation mechanism itself. In this regard, the at least one deflector may comprise a safety coupling or overload clutch in a drive train or power train of the actuation mechanism. In the event of an overload in that drive train causing a structural or mechanical disconnect via the safety coupling or clutch of the actuation mechanism, the deflector may then generate the above deflection or skew for detecting the problem of the overload.

As noted above, in another embodiment, the flight control surface is formed or provided by a flap or a slat for an aircraft wing structure. For example, the flap may be a high-lift flap that is employed for low-speed flight typical during take-off and landing of passenger aircraft in civil aviation. The first position of the support frame may therefore correspond to a retracted position for the control surface in service (e.g. flap is retracted) and the second position may correspond to an extended position for the control surface in service (e.g. flap is extended). In this connection, the support frame may be configured to translate, to pivot, and/or to rotate between the first position and the second position.

In another embodiment, the actuation mechanism comprises a drive unit that is operatively connected to the support frame and drivable through a range of motion to move the support frame between the first position and the second position. The deflector is configured to deflect or skew the support frame with respect to the first position upon a fault in or release of the operative connection between the drive unit and the support frame. The drive unit may be a linear drive unit or linear actuator, and may be electrically or hydraulically activated. As an example, the linear drive unit is a screw-driven linear actuator, such as a ball-screw linear actuator. In this case, the biasing member of the deflector may be a spring, especially a torsion spring, configured to exert a torsional biasing force between the screw and nut of the drive unit to deflect the screw and nut in their positions relative to one another in the drive unit and thereby deflect or skew the support frame, which is driven and/or supported by that linear drive unit. Alternatively, however, the drive unit may be a non-linear actuator, such as a geared rotary actuator.

According to another aspect, the present invention provides an aircraft comprising:
  an airframe structure, in particular a wing structure;
  a support frame mounted on the airframe structure for movement between a first position and a second position;
  a flight control surface supported on the support frame, wherein movement of the support frame between the first and second positions moves the flight control surface during operation of the aircraft;
  at least two actuation mechanisms separately provided on the airframe structure for effecting movement of the support frame between the first position and the second position; and
  a detection device for detecting a fault in either one of the actuation mechanisms, wherein the detection device comprises at least one deflector configured to deflect or skew the support frame with respect to the first position in the event of a fault in any one of the actuation mechanisms. In this regard, the detection device may include a separate deflector associated with each of the actuation mechanisms.

In another embodiment of the invention, the actuation mechanisms are configured for independent operation in parallel with one another laterally spaced apart on the airframe structure to effect movement of the support frame between the first position and the second position. Further, the detection device may comprise a separate deflector respectively associated with each actuation mechanism so as to generate the said deflection or skew in the event of a problem or fault in an operative connection of that actuation mechanism with the support frame. In this regard, the skew or deflection may result from a rotational moment generated by the deflector at the faulty actuation mechanism relative to the other, non-faulty actuation mechanism.

As discussed above, the detection device may comprise one or more sensors for detecting a deflection or skewing of the support frame away from or out of the first position. The one or more sensors may be configured to measure and/or assess a deflected or skewed position of the support frame supporting the flight control surface; for example, a translational and/or rotational or an angular deflection or skew in the position of the support frame with respect to the first position. Thus, the deflector typically includes at least one biasing member for generating a biasing force that acts to deflect or skew the support frame out of or away from the first position. Further, the biasing force generated by the biasing member may act in a direction opposite or counter to the actuation mechanism as it operates to move the support frame towards the first position. In the event of a release or fault in an operative connection between an actuation mechanism and the support frame, the biasing member then deflects or skews the support frame out of the first position. The at least one biasing member is typically resiliently deformable, e.g. elastically deformable. In this regard, the biasing member may comprise a spring member, such as a coil spring or a torsion spring. The biasing member may be mounted on the airframe structure, on the support frame, or on the actuation mechanism itself.

As also noted above, each deflector may comprise a safety coupling or overload clutch in a drive train or power train of the actuation mechanism. In this way, if there is an overload in the drive train of that actuation mechanism, the safety coupling or clutch causes a structural or mechanical disconnect and the deflector can generate a deflection or skew in the position of the support frame at the respective actuation mechanism for detecting the problem of the overload.

In another embodiment, each actuation mechanism comprises a drive unit operatively connected to the support frame and drivable through a range of motion to move the support frame between the first position and the second position. The drive unit may be a linear drive unit, such as a ball-screw linear actuator. In that case, the biasing member of the respective associated deflector may be a torsion spring member that is configured to exert a torsional biasing force between a screw and a nut of the linear drive unit to deflect the screw and nut in their positions relative to one another and thus also deflect or skew the support frame that is driven and/or supported by this linear drive unit. Alternatively, the drive unit may be a non-linear actuator, such as a geared rotary actuator. The drive unit may be electrically or hydraulically activated.

According to a further aspect, the present invention provides a method of detecting a problem or fault in a system for actuation of a flight control surface of an aircraft, the method comprising:
  providing a support frame supporting a flight control surface of an aircraft, the support frame mounted on an air-frame structure of the aircraft for movement between a first position and a second position to move the flight control surface in service;
  providing an actuation mechanism for effecting movement of the support frame between the first position and the second position;
  generating a biasing force that acts against the moving force of the actuation mechanism to deflect or skew the support frame with respect to the first position in the event of a problem or fault in an operative connection between the actuation mechanism and the support frame; and sensing or measuring position or posture of the support frame when the actuation mechanism moves the support frame to the first position to detect any deflection or skew with respect to the first position.

In a further embodiment, the flight control surface of the aircraft may be provided by a wing flap or wing slat. In this regard, a wing flap is typically provided at a trailing edge of the wing structure and can be extended to modify the wing profile for generating more lift at lower airspeeds, which is useful during take-off and landing. A wing slat, on the other hand, is typically provided at a leading edge of the wing structure and can likewise be used to enhance lift.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as it accorded to such terms and expressions with respect to their corresponding respective areas of inquiry and study, except where specific meanings have otherwise been set forth herein.

DETAILED DESCRIPTION OF EMBODIMENTS

Figure 1:
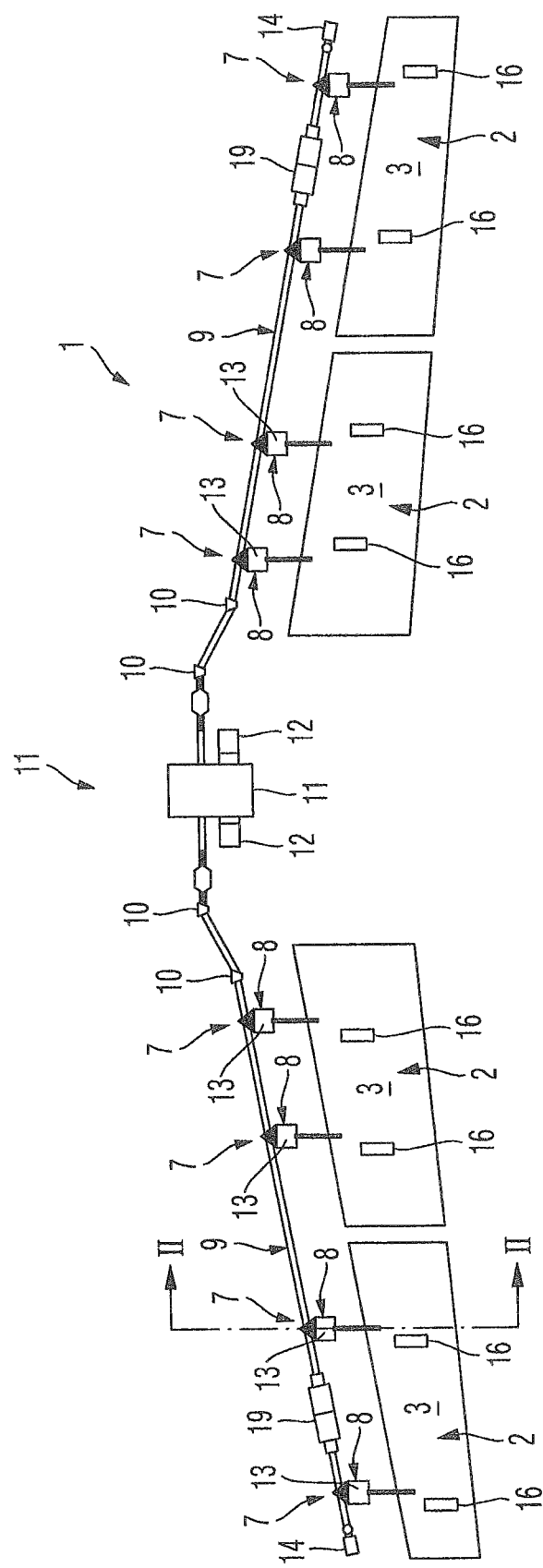
FIG. 1 is a schematic plan view of an actuation system for flight control surfaces in a wing structure of an aircraft according to an embodiment of the invention.
Figure 2:
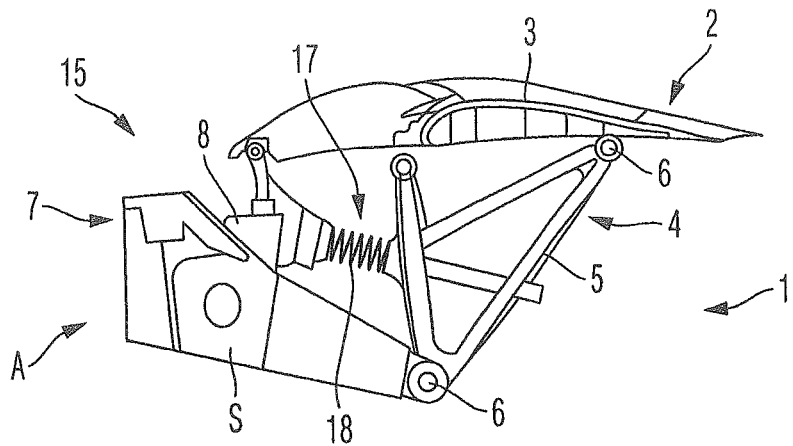
FIG. 2 is a perspective side view of the actuation system according to the embodiment in FIG. 1 taken in the direction of arrows II-II.

With reference firstly to FIG. 1 and FIG. 2 of the drawings, an actuation system 1 for flight control surfaces 2 in a wing structure S of an aircraft is illustrated. In FIG. 1, the actuation system 1 is shown schematically in plan view and in this embodiment each wing of the aircraft (not shown) has two trailing-edge flaps or flap panels 3, each of which provides or forms the movable flight control surfaces 2 for regulating the flight characteristics of the aircraft. Referring now to FIG. 2 of the drawings, it can be seen that each of the flaps or flap panels 3 is securely fixed and supported on a support frame 4 which, in turn, is itself movably mounted on the wing or airframe structure S. The support frame 4 essentially thus provides a positioning linkage for moving the flight control surface 2 of the flap 3 to a desired position or orientation.

In this embodiment, the flaps or flap panels 3 are provided as Fowler flaps, which are securely mounted via pivot joints on struts 5 of the support frame 4 at a trailing edge region of the wing structure S. In particular, the support frame 4 (or positioning linkage) is mounted to the wing structure S via pivot joints 6 for movement between a first, retracted position $P_1$ (as shown in FIG. 2), in which the flaps or flap panels 3 are essentially retracted or withdrawn inside the respective aircraft wing, and a second, extended position $P_2$ (not shown), in which the control surfaces 2 of the flap panels 3 are fully projected from the wings.

As is apparent from FIG. 1, the actuation system 1 comprises two separate actuating mechanisms 7 associated with each of the flaps 3. Each of the individual actuating mechanisms 7 is independently operated and sufficiently robust and powerful to support and/or operate the respective flap 3 alone, i.e. each actuating mechanisms 7 is able to move the support frame 4 (and thus the flight control surfaces 2) between the first and second positions $P_1$, $P_2$ independently and without further assistance. This design redundancy in the actuating mechanisms 7 provides the flight control surfaces 2 with multiple load paths to reduce the risk of a possible loss of function in the movable flight control surfaces 2, and thereby ensure greater safety and reliability of the actuation system 1. Each actuating mechanism 7 comprises a linear actuator or drive unit 8 that drives the movement of the support frame 4 between first and second positions $P_1$, $P_2$ and so provides positional control of the flap 3 and its control surfaces 2 during operation of the aircraft. Furthermore, however, the linear actuators or drive units 8 also provide a structural link in the mounting of the flaps 3 within the wing structure S of the aircraft. Each of the linear actuators 8 is desirably provided in the form of a ball-screw mechanism.

Each of the actuation mechanisms 7 is connected in parallel via a hydraulic power train 9 and transmission gearbox 10 in each wing to a central hydraulic power control unit (PCU) 11 having hydraulic motors 12. The linear drive unit 8 of each actuation mechanism 7 optionally includes a no-back/friction brake device 13. Further, the PCU 11 may include at least one transmission gear box 10 and transmission speed sensor unit (TSSU) 14 for monitoring and regulating the power transmitted to each of the actuation mechanisms 7 via the hydraulic power train 9 extending along each wing of the wing structure S. The hydraulic power train 9 may further include a wing tip brake (WTB) 19 for each of the wings W.

The actuation system 1 of this embodiment further includes detection device 15 for detecting a problem or fault in any one of the actuation mechanisms 7 associated with one of the flaps or flap panels 3. To this end, the detection device 15 includes sensors 16 for sensing or measuring the position or posture of each of the flap 3 at any particular time. For example, each of the flaps 3 includes at least one position pick-off unit (PPU) 16 associated with a respective one of the actuation mechanisms 7 for monitoring the actual or current position of the flap 3 at that actuation mechanism 7. With reference to FIG. 2 of the drawings, the detection device 15 further includes a deflector 17 in the form of at least one biasing member 18, such as a torsion spring, which is provided in an operative connection between the linear drive unit 8 and the support frame 4 of the flap 3 for generating a biasing force which acts on the support frame 4 in a direction away from or out of the first position $P_1$. This biasing force is directed against the movement force of the actuation mechanism 7 which acts on the support frame 4 when moving the support frame from the second to the first position.

Accordingly, when the linear drive unit 8 is operated to move the support frame 4 and thus the flap panel 3 into the first position $P_1$, the drive unit 8 must overcome the biasing force of the spring 18. In the event of a problem or fault in the operative connection between the support frame 4 and the linear drive unit 8, therefore, the spring 18 will generate a deflection or skewing of the support frame 4 with respect to the first position $P_1$ at this particular actuation mechanism. By virtue of the redundancy provided by the plurality of linear actuators or drive units 8 for each of the wing flaps, proper movement and operation of the flaps 3 is nevertheless maintained despite that malfunction the actuation mechanism. Due to the detectable deflection or skewing in a position of the support frame 4 created by the spring 18 at the failed or malfunctioning actuation mechanism 7, however, the presence of that malfunction is nevertheless readily detected to allow for prompt servicing and repair of the actuation system 1. This is particularly true for situations where no external loads or forces act on the control surface, such as air loads during flight of the aircraft. For example, when the aircraft is still on the ground, any fault or malfunctioning of the actuation mechanism 7 can be readily detected by virtue of the deflection or skewing created by the spring 18.

Figure 3:
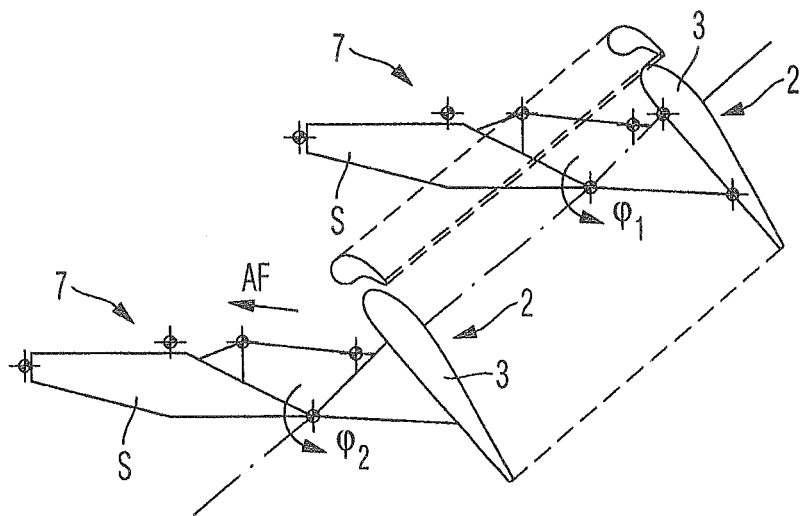
FIG. 3 is a schematic perspective diagram of the actuation system according to the embodiment in FIG. 2.
Figure 4:
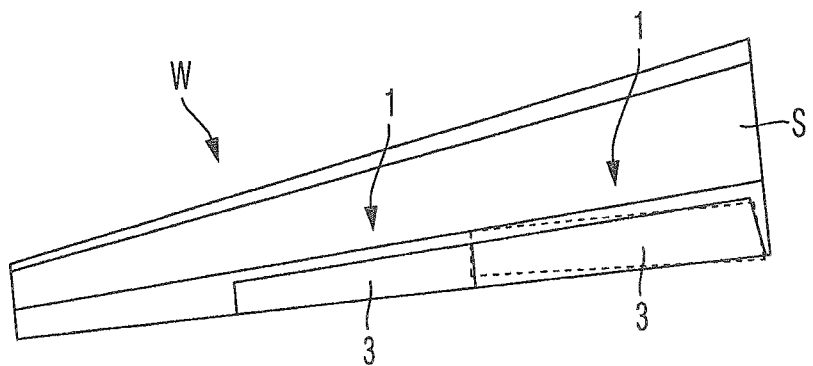
FIG. 4 is a plan view of the wing structure of an aircraft according to an embodiment of the invention having the actuation system shown in FIG. 1.

With now reference to FIG. 3 and FIG. 4 of the drawings, the deflection or skewing of the flap panel 3 at a malfunctioning actuation mechanism 7 is specifically illustrated. In this regard, FIG. 3 shows the hydraulically activated linear drive units 8 operating in parallel for a particular flap panel 3 of the wing structure S. By virtue of the mechanical inter-connection of the two actuation mechanism stations operating the same flap panel 3, an actuating force AF generated at a properly functioning (master) actuation mechanism station 2 is applied over the entire flap 3 and also transmitted to the malfunctioning (slave) actuation mechanism station 1, which ensures proper retraction of the flap panel 3 in service. Importantly, however, the spring member 18 at the actuation mechanism station 1 causes a detectable deflection or skewing of the support frame 4 and flap panel 3 at that actuation mechanism 7, which in turn leads to a difference in the final angular rotation of the support frame to its final position. Specifically, the properly functioning (master) actuation mechanism station 2 rotates the support frame 4 through an angle $\phi_2$ to a fully retracted first position $P_1$, whereas the malfunctioning (slave) actuation mechanism station 1 rotates through an angle $\phi_1$ not quite corresponding to the first position because the local drive unit 8 at that station 1 is not properly acting to fully overcome the biasing force from the spring 18. In this way, a skewing rotational moment is generated between the laterally spaced actuating mechanisms 7 of the wing flap 3 by the torsional spring deflector 17 at the (slave) actuation mechanism 7 having the faulty operative connection to the pivoting linkage of the support frame 4.

Figure 5:
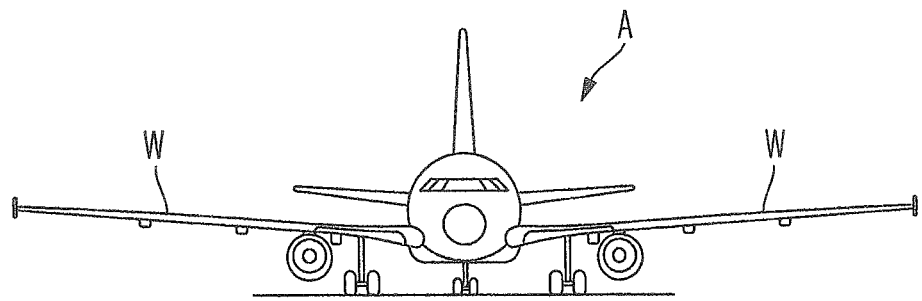
FIG. 5 shows an aircraft according to an embodiment of the invention.

The sensors 16 are designed to compare the angular positions $\phi_1$, $\phi_2$ of the two actuation mechanisms 7 so that, in this particular example, a skewing may be considered to exist in the angular discrepancy ($\phi_2-\phi_1$) that arises between the two actuation stations 1, 2. For illustrative purposes, this skewing is over-emphasized by the dashed lines shown in FIG. 4 for the in-board flap 3 of the wing W. In this regard, also, FIG. 5 of the drawings shows an example of an aircraft A having such wings W incorporating a wing structure S and actuation system 1 for the flap control surfaces 2 described above with reference to FIGS. 1 to 4.

Figure 6:
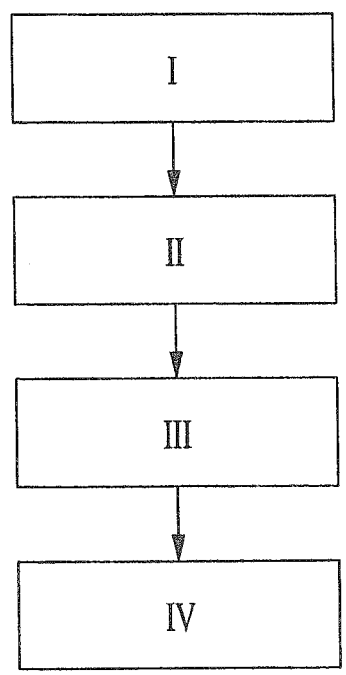
FIG. 6 is a flow diagram which schematically represents a method according to an embodiment of the invention.

Having described the actuation system 1 of the invention, and an aircraft A incorporating that system, reference is made to drawing FIG. 6 which shows a block diagram that schematically illustrates a method essentially corresponding to the system of the invention described above. The boxes of the diagram are numbered I to IV to denote procedural stages of the method according to this embodiment. In this regard, the first box I of FIG. 6 represents the stage of providing a support frame 4 supporting a flight control surface 2 of an aircraft A, with the support frame 4 being movably mounted on an air-frame structure S of the aircraft A for movement between a first position $P_1$ and a second position $P_2$ so as to move the flight control surface 2 during service or operation of the aircraft. The second box II represents the stage of providing an actuation mechanism 7 for effecting or causing the movement of the support frame 4 between the first position $P_1$ and the second position $P_2$. The third box III represents the stage of generating a biasing force that acts against the movement force of the actuation mechanism 7 to deflect or skew the support frame 4 with respect to the first position $P_1$ in the event of a problem or fault (e.g. a disconnect) in an operative connection between the actuation mechanism 7 and the support frame 4. The fourth box IV then represents the stage of sensing or measuring a position or posture of the support frame 4 on the ground when the actuation mechanism 7 moves the support frame 4 to the first position $P_1$ to detect any deflection or skew with respect to the first position $P_1$.

The method is particularly useful for detecting a problem or fault in a system 1 for actuation of a flight control surface 2 of an aircraft A which is located on the ground, i.e. in a position where no substantial external forces like air loads act on the flight control surfaces.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

What is claimed is:

1. An actuation system for a flight control surface of an aircraft, comprising:
   a support frame for supporting a flight control surface, the support frame being configured to be mounted to an airframe structure of the aircraft for movement between a first position and a second position to move and operate the control surface;
   an actuation mechanism configured to effect movement of the support frame between the second position and the first position; and
   a detection device for detecting a problem or a fault in the actuation mechanism, the detection device comprising a deflector configured to deflect or skew the support frame away from or out of the first position in the event of a problem or fault in the operation of the actuation mechanism,
   wherein the deflector comprises at least one biasing member for generating a biasing force acting against a moving force of the actuation mechanism to deflect or skew the support frame out of the first position.

2. The actuation system according to claim 1, wherein the actuation mechanism is configured and arranged to operate against the biasing force to move the support frame to the first position.

3. The actuation system according to claim 1, wherein the biasing member is resilient.

4. The actuation system according to claim 3, wherein the biasing member comprises a spring member.

5. The actuation system according to claim 1, wherein the detection device comprises one or more sensor for detecting a deflection or skewing of the support frame with respect to the first position.

6. The actuation system according to claim 1, wherein the first position of the support frame corresponds to a retracted position for the control surface and the second position corresponds to an extended position for the control surface.

7. The actuation system according to claim 1, wherein the flight control surface is provided or formed by a movable flap or slat of an aircraft wing structure.

8. The actuation system according to claim 1, wherein the actuation mechanism comprises a drive unit which is operatively connected to the support frame and is drivable through a range of motion to move the support frame between the first position and the second position, wherein the deflection means is configured to deflect or skew the support frame out of the first position in the event of a fault in the operative connection between the drive unit and the support frame of the actuation mechanism.

9. The actuation system according to claim 7, wherein the drive unit is a linear drive unit, and wherein the support frame is configured at least partially to pivot or rotate between the first position and the second position.

10. An aircraft, comprising:
    an airframe structure;
    a movable support frame mounted on the airframe structure for movement between a first position and a second position;
    a flight control surface supported on the support frame, wherein movement of the support frame between the first and second position moves the control surface during aircraft operation;
    at least two actuation mechanisms provided on the airframe structure for effecting movement of the support frame between the first position and the second position; and
    a detection device for detecting a fault in either one of the actuation mechanisms, wherein the detection device comprises a deflector configured to deflect or skew the support frame with respect to, or out of, the first position in the event of a fault in any one of the actuation mechanisms,
    wherein the deflector includes at least one biasing member for generating a biasing force acting to deflect or skew the support frame out of or away from the first position.

11. The aircraft according to claim 10, wherein the detection device comprises one or more sensors for detecting, measuring and/or assessing a deflected or skewed position of the support frame supporting the flight control surface.

12. The aircraft according to claim 10, wherein each actuation mechanism comprises a drive unit operatively connected to the support frame and drivable through a range of motion to move the support frame between the first position and the second position, or a non-linear actuator, such as a rotary actuator.

13. The aircraft according to claim 12, wherein the non-linear actuator is electrically or hydraulically activated.

14. The aircraft according to claim 10, wherein at least two actuation mechanisms are provided for independent operation in parallel with one another laterally spaced apart on the airframe structure to effect movement of the support frame between the first position and the second position, wherein the detection device comprises a separate deflector respectively associated with each actuation mechanism to generate the said deflection or skew in the event of a problem or fault in an operative connection of that actuation mechanism with the support frame.

15. A method of detecting a problem or fault in a system for actuation of a flight control surface of an aircraft on the ground, the method comprising:
    providing a support frame supporting a flight control surface of an aircraft, the support frame mounted on an airframe structure of the aircraft for movement between a first position and a second position to move the flight control surface;
    providing an actuation mechanism for effecting movement of the support frame between the first position and the second position;
    generating a biasing force that acts against the moving force of the actuation mechanism to deflect or skew the support frame with respect to the first position in the event of a problem or fault in an operative connection between the actuation mechanism and the support frame; and
    sensing or measuring a posture of the support frame on the ground when the actuation mechanism moves the support frame to the first position to detect any deflection or skew with respect to the first position;

wherein the flight control surface is provided by a wing flap at a trailing edge of a wing structure.

* * * * *